United States Patent
Lu et al.

(10) Patent No.: US 12,408,082 B2
(45) Date of Patent: Sep. 2, 2025

(54) REDUCING NETWORK TRAFFIC ASSOCIATED WITH A THROUGHPUT INTENSIVE COMMUNICATION OVER A WIRELESS TELECOMMUNICATION NETWORK

(71) Applicant: T-Mobile USA, Inc., Bellevue, WA (US)

(72) Inventors: Kun Lu, Bellevue, WA (US); Egil Gronstad, Bellevue, WA (US); Jun Liu, Sammamish, WA (US); Lin Zhang, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 524 days.

(21) Appl. No.: 17/958,010

(22) Filed: Sep. 30, 2022

(65) Prior Publication Data
US 2024/0114397 A1    Apr. 4, 2024

(51) Int. Cl.
*H04W 28/20*    (2009.01)
*H04W 24/10*    (2009.01)
*H04W 64/00*    (2009.01)
*H04W 76/10*    (2018.01)

(52) U.S. Cl.
CPC .......... *H04W 28/20* (2013.01); *H04W 24/10* (2013.01); *H04W 64/00* (2013.01); *H04W 76/10* (2018.02)

(58) Field of Classification Search
CPC ..... H04W 28/20; H04W 76/10; H04W 24/10; H04W 64/00
See application file for complete search history.

(56) References Cited

U.S. PATENT DOCUMENTS

| | | |
|---|---|---|
| 6,996,072 B1 | 2/2006 | Minborg |
| 7,286,841 B2 | 10/2007 | Sun et al. |
| 7,299,069 B2 | 11/2007 | Claussen |
| 8,184,597 B2 | 5/2012 | Englund et al. |

(Continued)

FOREIGN PATENT DOCUMENTS

| | | |
|---|---|---|
| CN | 108605382 A | 9/2018 |
| CN | 105376293 B | 4/2020 |

(Continued)

*Primary Examiner* — Natasha W Cosme
(74) *Attorney, Agent, or Firm* — Perkins Coie LLP

(57) ABSTRACT

The system determines that an application running user equipment (UE) is requesting a throughput intensive communication over a network. The throughput intensive communication can require a predetermined downlink and uplink throughput. The system sends a first indication to the network, specifying to a base station of the network that the UE is requesting the throughput intensive communication. The base station determines whether it can provide the downlink throughput and the uplink throughput to the UE. Upon determining that the base station cannot provide the downlink or the uplink throughput to the UE, the base station sends a first message to the UE, indicating that the throughput intensive communication is of low quality. Upon receiving the first message, the UE waits for a predetermined criterion to be satisfied before attempting to engage in the throughput intensive communication, thereby reducing network traffic by eschewing sending repeated requests for the throughput intensive communication.

20 Claims, 10 Drawing Sheets

(56) References Cited

U.S. PATENT DOCUMENTS

| | | |
|---|---|---|
| 8,289,954 B2 | 10/2012 | Tenny et al. |
| 8,312,337 B2 | 11/2012 | Park et al. |
| 8,331,912 B1 | 12/2012 | Lundy et al. |
| 8,358,629 B2 | 1/2013 | Grilli et al. |
| 8,493,353 B2 | 7/2013 | Blanchflower et al. |
| 8,976,677 B2 | 3/2015 | Novak et al. |
| 9,137,844 B2 | 9/2015 | Kitazoe |
| 9,210,618 B2 | 12/2015 | Chen et al. |
| 9,392,533 B1 | 7/2016 | Vivanco et al. |
| 9,585,037 B1 | 2/2017 | Davari et al. |
| 9,591,679 B2 | 3/2017 | Bontu et al. |
| 9,609,510 B2 | 3/2017 | Raleigh et al. |
| 9,635,530 B2 | 4/2017 | Ayyalasomayajula et al. |
| 9,642,147 B2 | 5/2017 | Barbieri et al. |
| 9,661,602 B2 | 5/2017 | Annamalai et al. |
| 9,723,651 B2 | 8/2017 | Ozturk et al. |
| 9,749,884 B1 | 8/2017 | Cummings |
| 9,807,651 B2 | 10/2017 | Mujtaba et al. |
| 9,860,781 B2 | 1/2018 | Cui et al. |
| 9,876,903 B2 | 1/2018 | Yerrabommanahalli et al. |
| 9,883,384 B2 | 1/2018 | Lee et al. |
| 9,900,443 B2 | 2/2018 | Pattabiraman et al. |
| 9,906,996 B2 | 2/2018 | Lou et al. |
| 9,949,314 B2 | 4/2018 | Zhao et al. |
| 9,967,794 B2 | 5/2018 | Park et al. |
| 10,039,013 B2 | 7/2018 | Periyasamy et al. |
| 10,111,135 B2 | 10/2018 | Schwarzbauer et al. |
| 10,154,470 B2 | 12/2018 | Edge et al. |
| 10,244,448 B2 | 3/2019 | Chong et al. |
| 10,292,055 B2 | 5/2019 | Carpenter et al. |
| 10,299,211 B2 | 5/2019 | Shi et al. |
| 10,785,155 B2 | 9/2020 | Damola et al. |
| 10,827,338 B1 | 11/2020 | Bodapotula et al. |
| 10,863,556 B2 | 12/2020 | Lau et al. |
| 10,999,854 B2 | 5/2021 | Fu et al. |
| 11,006,293 B1 | 5/2021 | Singh et al. |
| 11,019,528 B2 | 5/2021 | Yang et al. |
| 11,026,121 B2 | 6/2021 | Shih et al. |
| 11,038,741 B2 | 6/2021 | Machou et al. |
| 11,044,786 B2 | 6/2021 | Kuppelur et al. |
| 11,122,471 B2 | 9/2021 | Chiang et al. |
| 11,178,586 B2 | 11/2021 | Luo et al. |
| 11,202,212 B2 | 12/2021 | Karanam |
| 11,206,589 B2 | 12/2021 | Chen et al. |
| 11,272,415 B2 | 3/2022 | Araujo et al. |
| 11,297,513 B2 | 4/2022 | Agarwal et al. |
| 11,330,653 B2 | 5/2022 | Paladugu et al. |
| 11,356,857 B1 | 6/2022 | Vivanco et al. |
| 11,405,971 B2 | 8/2022 | Jain et al. |
| 11,425,659 B2 | 8/2022 | He et al. |
| 11,432,201 B2 | 8/2022 | Kwok et al. |
| 2005/0233733 A1 | 10/2005 | Roundtree et al. |
| 2006/0142020 A1 | 6/2006 | Mueckenheim et al. |
| 2006/0142021 A1 | 6/2006 | Mueckenheim et al. |
| 2012/0020393 A1 | 1/2012 | Patil et al. |
| 2012/0295617 A1 | 11/2012 | Anchan et al. |
| 2013/0196647 A1 | 8/2013 | Raleigh et al. |
| 2013/0223294 A1 | 8/2013 | Karjalainen et al. |
| 2014/0254398 A1* | 9/2014 | Li ............... H04W 28/0846 370/252 |
| 2018/0227902 A1* | 8/2018 | Gholmieh ............ H04B 7/0413 |
| 2020/0187014 A1 | 6/2020 | Sevindik |
| 2020/0322970 A1 | 10/2020 | Duet et al. |
| 2020/0351792 A1 | 11/2020 | Ghelichi et al. |
| 2021/0067945 A1 | 3/2021 | Liu et al. |
| 2021/0250828 A1 | 8/2021 | Vaidya et al. |
| 2021/0282125 A1 | 9/2021 | Pezeshki et al. |
| 2021/0377866 A1 | 12/2021 | Kim et al. |
| 2022/0167442 A1 | 5/2022 | Dong et al. |
| 2022/0232605 A1 | 7/2022 | Kim et al. |

FOREIGN PATENT DOCUMENTS

| | | |
|---|---|---|
| CN | 113196700 A | 7/2021 |
| EP | 2070381 B1 | 2/2012 |
| EP | 2801065 A1 | 11/2014 |
| EP | 2813039 A1 | 12/2014 |
| EP | 2826269 A1 | 1/2015 |
| EP | 3209043 A1 | 8/2017 |
| EP | 3308528 A1 | 4/2018 |
| EP | 2795983 B1 | 4/2019 |
| EP | 3501204 A1 | 6/2019 |
| EP | 3180907 B1 | 2/2020 |
| EP | 3840524 B1 | 9/2021 |
| JP | 5528965 B2 | 4/2014 |
| JP | 5922475 B2 | 4/2016 |
| JP | 6606431 B2 | 10/2019 |
| KR | 20200086729 A | 7/2020 |
| KR | 20210019103 A | 2/2021 |
| KR | 102412510 B1 | 6/2022 |
| WO | 2011016173 A1 | 2/2011 |
| WO | 2014116983 A1 | 7/2014 |
| WO | 2015112108 A1 | 7/2015 |
| WO | 2015155411 A1 | 10/2015 |
| WO | 2015161519 A1 | 10/2015 |
| WO | 2017133610 A1 | 8/2017 |
| WO | 2018104834 A1 | 6/2018 |
| WO | 2020148658 A2 | 7/2020 |
| WO | 2020185949 A2 | 9/2020 |
| WO | 2021162927 A1 | 8/2021 |
| WO | 2021163394 A1 | 8/2021 |
| WO | 2022152620 A1 | 7/2022 |
| WO | 2022155431 A1 | 7/2022 |

* cited by examiner

REDUCING NETWORK TRAFFIC ASSOCIATED WITH A THROUGHPUT INTENSIVE COMMUNICATION OVER A WIRELESS TELECOMMUNICATION NETWORK

BACKGROUND

With the 5G wireless telecommunication network in full development and operational in over 72 countries worldwide in March 2022, extended reality (XR) powered by 5G is expected to become a popular application, which can change the way people are surfing the Internet—namely, from 2D surfing to 3D surfing. According to predictions, there will be over 100 million XR users by 2025 and 1 billion by 2030. XR applications are throughput intensive, and the 5G network may not be able to provide the needed bandwidth at all times. However, the UE might not know the status of the network and can keep trying to access XR services, which can congest the network and result in even worse user experience.

BRIEF DESCRIPTION OF THE DRAWINGS

Detailed descriptions of implementations of the present invention will be described and explained through the use of the accompanying drawings.

Figure 1:
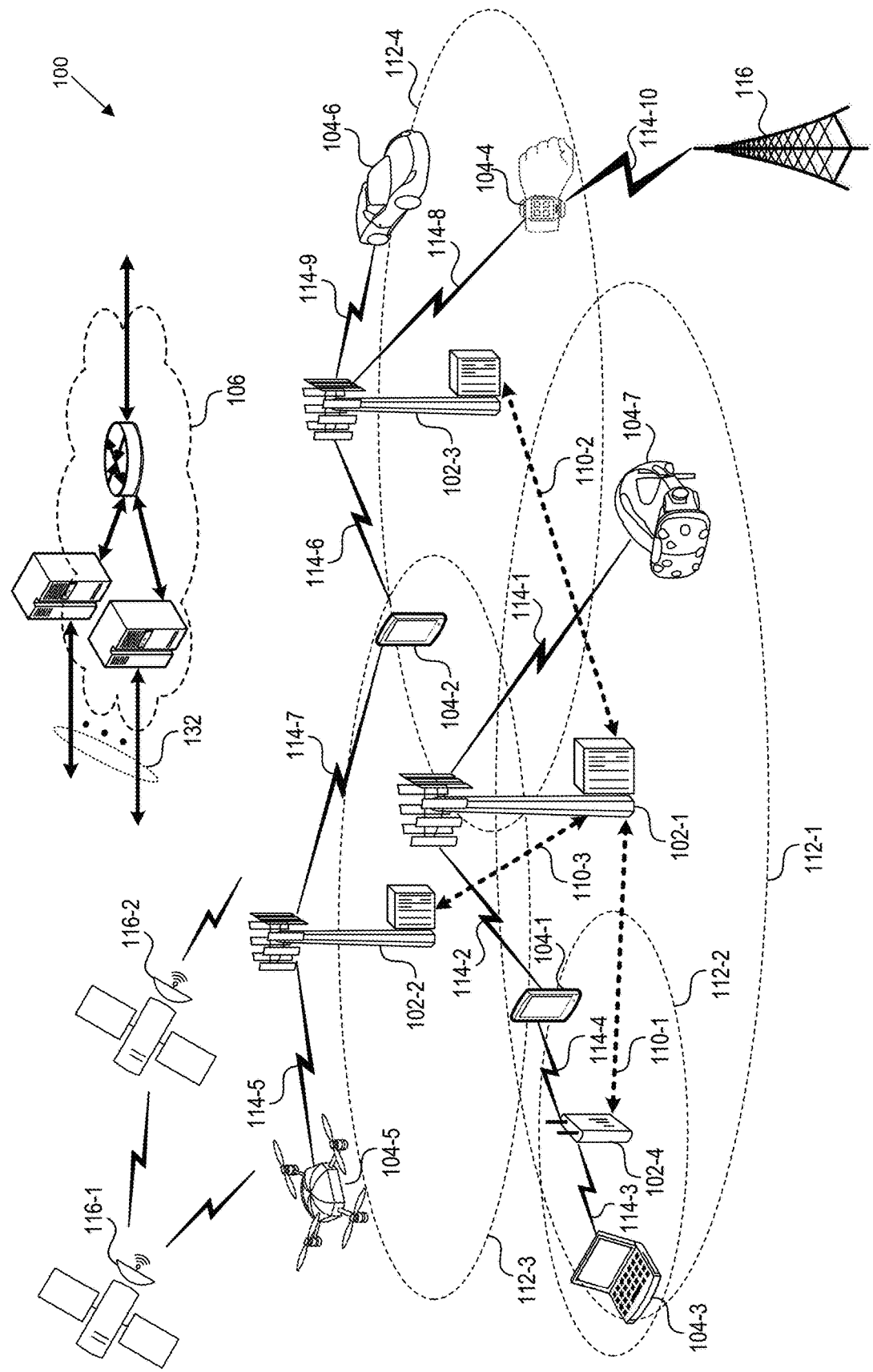
FIG. 1 is a diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to reduce network traffic associated with an extended reality communication over a 5G or higher generation wireless telecommunication network ("5G+ network"). The system can determine that an application associated with a mobile device is requesting an extended reality communication over the 5G or higher generation wireless telecommunication network. The extended reality communication includes real-and-virtual combined environments and human-machine interactions generated by computer technology and wearables. The desired downlink throughput associated with the extended reality communication is approximately above 20 megabits per second (Mbps). The desired uplink throughput associated with extended reality communication is approximately up to 10 Mbps.

The mobile device sends a first indication to the 5G+ wireless telecommunication network, requesting extended reality communication from a base station that forms part of the 5G+ network. The base station determines whether it can provide the needed downlink throughput and uplink throughput to the mobile device. The base station can make this determination based on a location of the UE, RF associated with the UE, number of UEs connected to the base station, available base station resources, buffer estimation, hybrid automatic repeat request (hybrid ARQ or HARQ) feedback, etc., as described below. Upon determining that the base station cannot provide the desired downlink and uplink throughput to the mobile device, the base station can send a message to the mobile device indicating that the extended reality communication is not available or will be of low-quality.

Upon receiving the message, the mobile device can wait for another message from the 5G+ network indicating that the extended reality communication is available, thereby reducing network traffic associated with an extended reality communication by eschewing sending repeated requests for the extended reality communication.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as user equipment (UE), customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
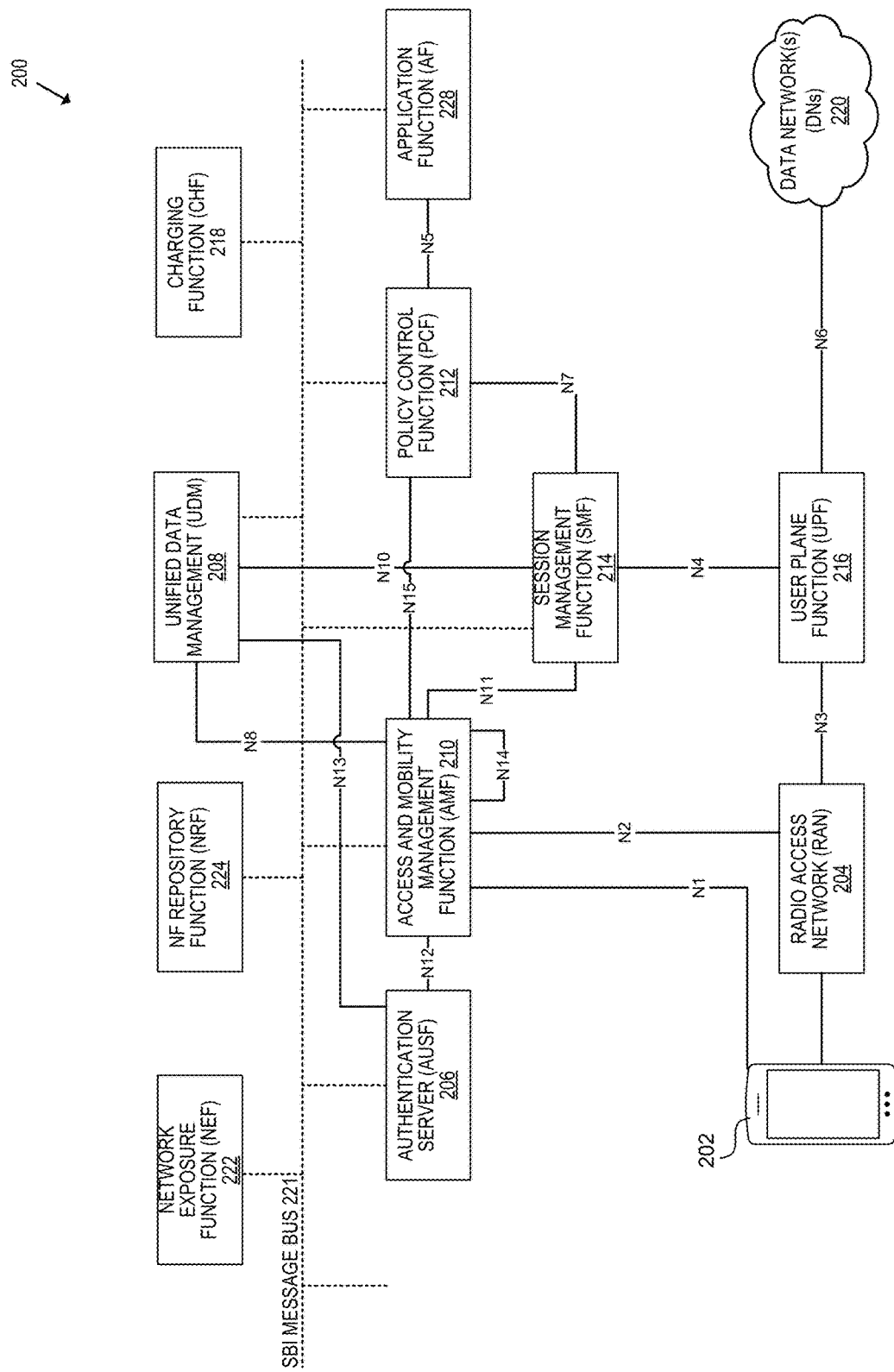
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed, multi-access edge compute cloud environment and a single point of entry for a cluster of network functions once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical Quality of Service (QoS) and charging rules, includes Network Slice selection, which is regulated by the NSSF 226.

Figure 3:
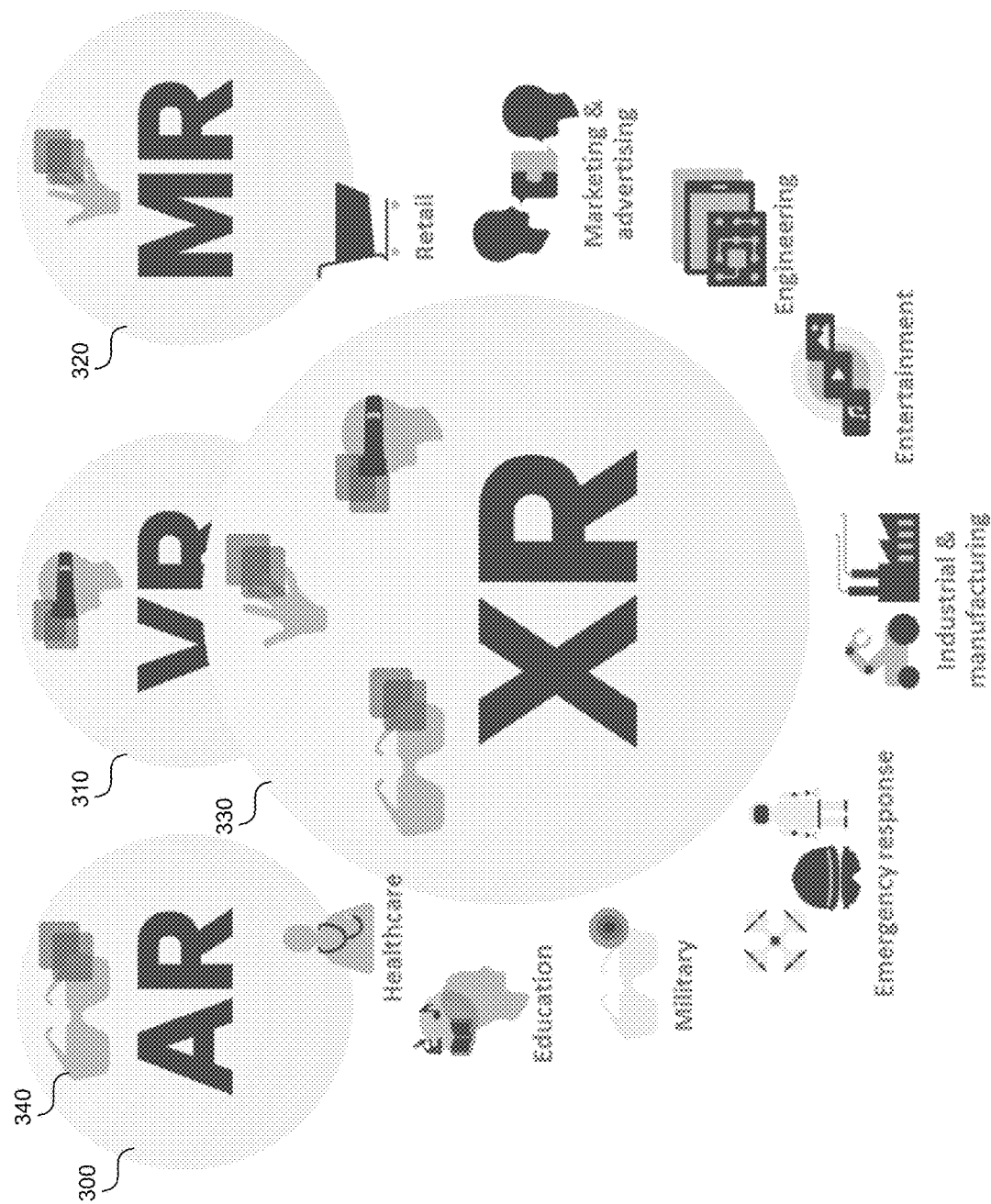
FIG. 3 shows different types of artificial realities.

Reducing Network Traffic Associated with a Throughput Intensive Communication Over a Wireless Telecommunication Network FIG. 3 shows different types of artificial realities. Virtual reality (VR) 310 is a rendered version of a delivered visual and audio scene. The rendering is designed to mimic the visual and audio sensory stimuli of the real world as naturally as possible to users as they move within the limits defined by the application, typically in a pseudo-3D user experience.

Augmented reality (AR) 300 provides the user with additional information or artificially generated items or content overlaid upon their current environment. The additional information or content is usually visual and/or audible. The user's observation of his or her current environment can be direct, with no intermediate sensing, processing, and rendering. Alternatively, the user's observation of the current environment can be indirect, where the user's perception of the environment is relayed via sensors and can be enhanced or processed.

Mixed reality (MR) 320 is an advanced form of AR 300 where some virtual elements are inserted into the physical scene with the intent to provide the illusion that these elements are part of the real scene.

Extended reality (XR) 330 refers to all real-and-virtual combined environments and human-machine interactions generated by computer technology and wearables. XR includes representative forms, such as AR 300, VR 310, and MR 320, and the areas interpolated among them.

The 5G network 100 in FIG. 1 can provide XR content to a UE 340. The XR content can include 3D messaging, AR sharing, and real-time 3D communication etc., as defined by 3GPP 26.928. To support an XR application, the basic downlink (DL) throughput needs to be approximately 30 megabits per second (Mbps), while the uplink (UL) throughput needs to be 10 Mbps or less. The packet delay needs to be between 10 ms to 30 ms.

In general, the 5G network 100 is designed to provide DL at approximately 2 Mbps at the edge of coverage areas 112-1 through 112-4 in FIG. 1, and approximately 200 kilobits per second URL at the edge of coverage areas 112-1 through 112-4. Consequently, the network 100 cannot provide the needed throughput required by XR everywhere. While the UE 340 is close to the cell site 102-1-102-3 in FIG. 1, the UE 340 can receive XR service at the needed throughput, but in some other locations such as the edge of coverage areas 112-1 through 112-4, the UE 340 may not. In addition, time of day can affect the XR service such as during peak hours when the network is congested. However, the UE 340 may not know that the XR service is not available or of low-quality due to location or time of day, and the UE may keep trying to access service which can result in excessive network 100 traffic and consequently bad user experience.

Figure 4:
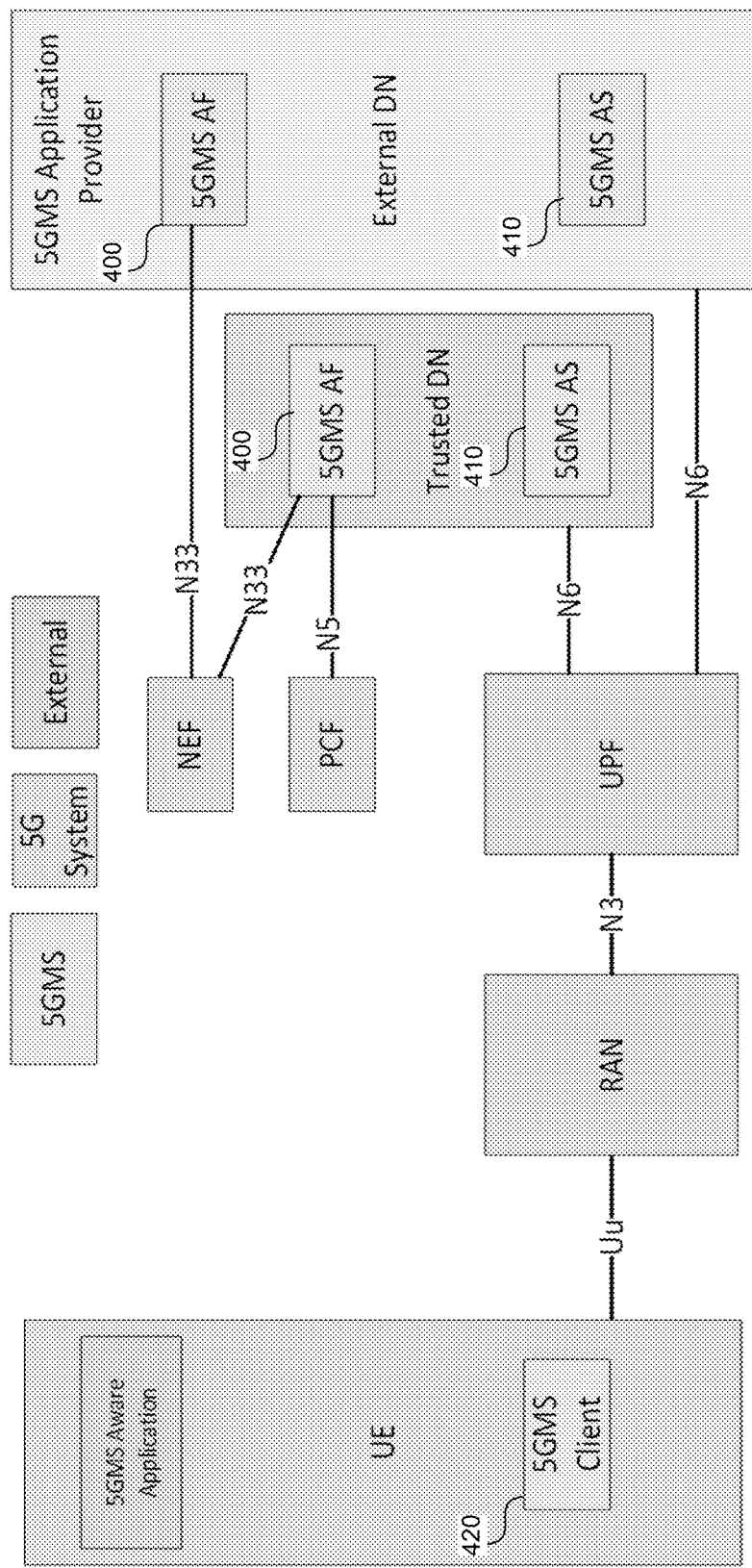
FIG. 4 shows media streaming within the 5G network.

FIG. 4 shows media streaming within the 5G network 100 in FIG. 1. 5G Media Service (5GMS) AF 400 is an application function similar to that defined in TS 23.501 clause 6.2.10, dedicated to 5G media streaming. 5GMS AS 410 is an application server dedicated to 5G media streaming.

5GMS client 420 is a UE internal function dedicated to 5G media streaming. The 5GMS client 420 is a logical function and its subfunctions may be distributed within the UE according to implementation choice.

Figure 5:
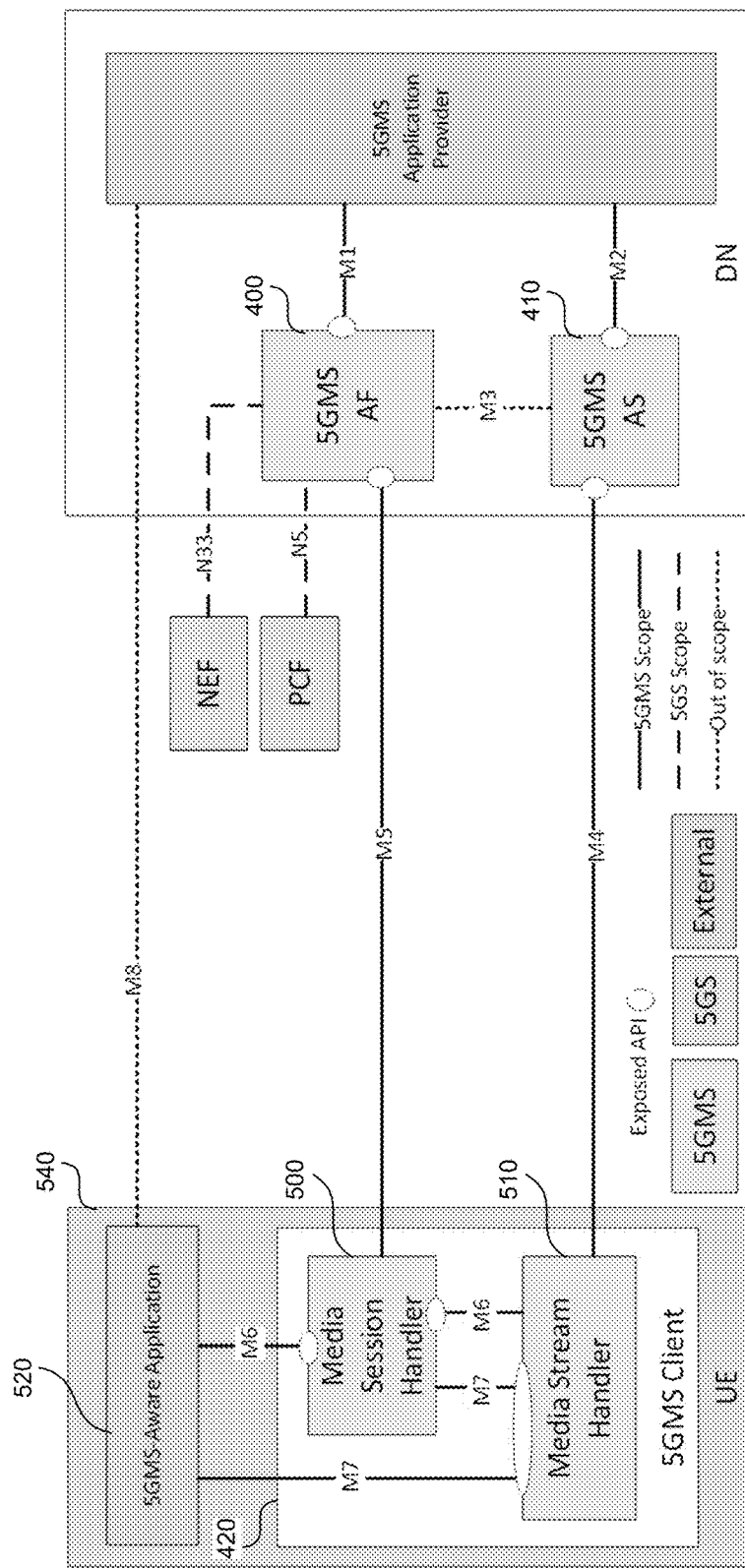
FIG. 5 shows extended reality communication within the 5G network.

FIG. 5 shows extended reality communication within the 5G network 100 in FIG. 1. The 5GMS client 420 running on the UE 540 can include a media session handler 500 and a media stream handler 510, which are constituent functions exposing APIs to one another in the same way that those APIs M6 and M7 are exposed to 5GMS-aware application 520. The 5GMS client 420 does not have to expose APIs M6 and M7 within the 5GMS client. The 5GMS client 420 can be completely self-contained, such that all functionality to politically implementing in the 5GMS-aware application 520 is embedded in the UE 540, and thus interfaces M6 and M7 are not exposed at all.

The media session handler 500 is a module running on the UE 540 that communicates with the 5GMS AF 400 to establish control and support the delivery of a media session and can perform additional functions such as consumption and quality of experience (QoE) metrics collection and reporting. The media session handler 500 can expose APIs M6 and M7 that can be used by the 5GMS-aware application 520.

The media stream handler 510 is a module running on the UE 540 that communicates with the 5GMS AS 410 to stream the media content and can provide APIs to the 5GMS-aware application 520 for media playback and to the media session handler 500 for media session control.

Figure 6:
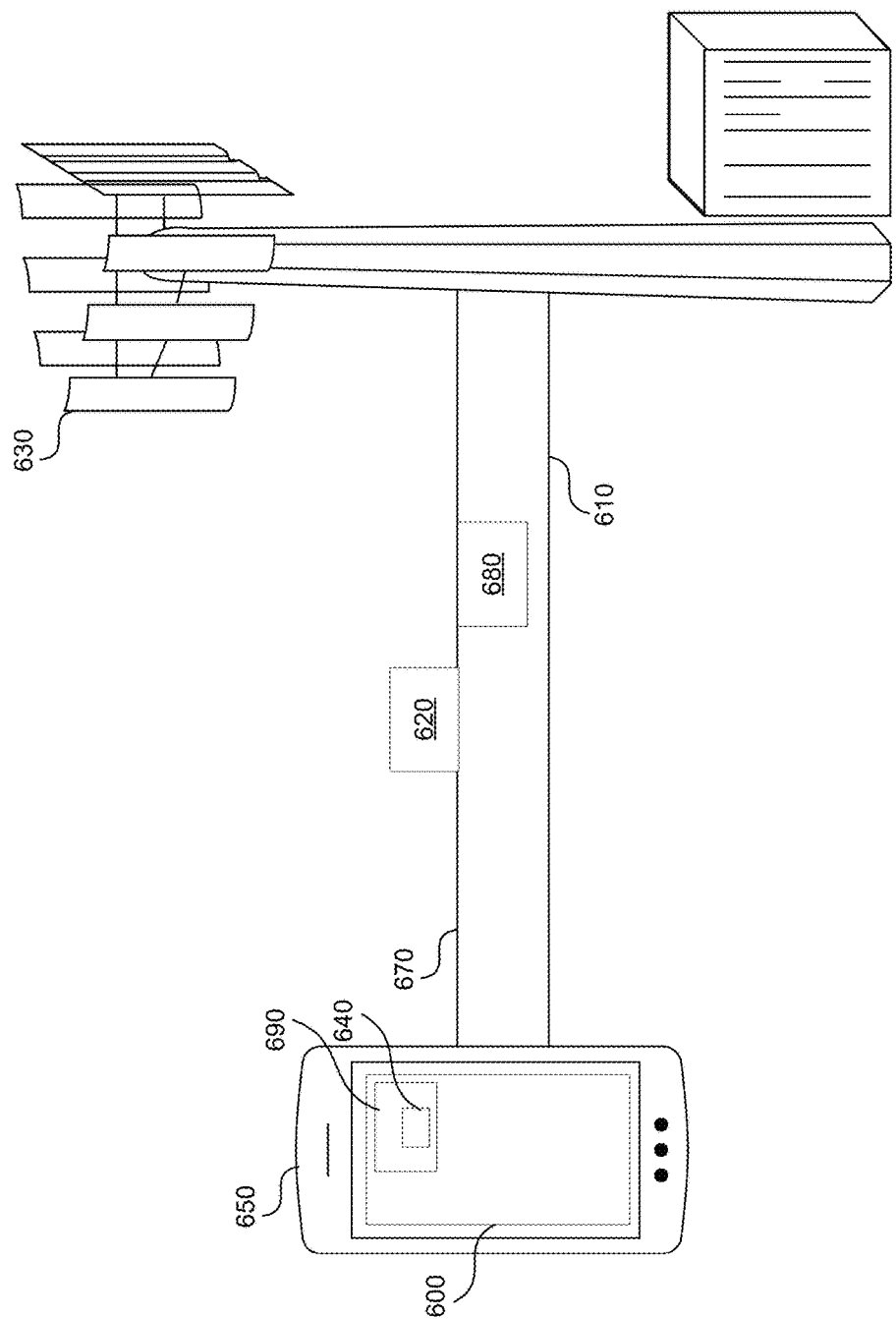
FIG. 6 shows communication between UE and the base station.

FIG. 6 shows communication between UE and the base station. A throughput intensive application 600, such as an XR application, can be the 5GMS-aware application 520 in FIG. 5. The throughput intensive application 600 can initiate a throughput intensive communication 610, e.g., an XR communication, and send the indication 620 to the base station 630 associated with the network 100 in FIG. 1, requesting XR content. The initiation of throughput intensive communication 610 can use a new user assistance information element or use an existing user assistance information spare bit to send the indication. The UE 650 can send indication 620 using the radio resource control (RRC) protocol 670 to the base station 630 associated with the network 100. The UE 650 can send indication 620 along with regularly sent radio frequency (RF) measurements such as Reference Signals Received Power (RSRP).

The base station (BS) 630 can determine whether it can provide the desired downlink throughput and the desired uplink throughput to the UE 650, based on a location of the UE, RF associated with the UE such as RSRP level, number of UEs connected to the base station, available base station resources, buffer estimation, hybrid automatic repeat request (hybrid ARQ or HARQ) feedback, current base station load, etc. HARQ is a combination of high-rate forward error correction (FEC) and automatic repeat request (ARQ) error control. In standard ARQ, redundant bits are added to data to be transmitted using an error-detecting (ED) code such as a cyclic redundancy check (CRC). Receivers detecting a corrupted message will request a new message from the sender. In Hybrid ARQ, the original data is encoded with an FEC code, and the parity bits are either immediately sent along with the message or only transmitted upon request when a receiver detects an erroneous message.

If the base station 630 determines that it can provide throughput intensive communication at the desired downlink and uplink throughput, the base station 630 can provide extended reality content to the UE 650. However, if the base station 630 determines that it cannot provide throughput intensive communication at the desired downlink and uplink throughput, the base station can send a message 680 to the UE 650 indicating that throughput intensive communication 610 is not available or of low-quality.

The UE 650 can provide a notice 690 indicating that the throughput intensive communication 610 is not available or of low-quality. The notice 690 can be an icon shown in a corner of the UE 650 to not obstruct view of other UE display. The user can select a button 640, such as an "OK" button 640 or the notice 690 itself, and the notice 690 can disappear. By selecting the button 640, the user indicates that the UE 650 should not keep requesting throughput intensive communication 610. If the user is already engaged in throughput intensive communication 610, by selecting the button 640, the user indicates that the UE 650 should cease engaging in the throughput intensive communication 610. The user not selecting the button 640 indicates to the UE 650 to continue requesting throughput intensive communication. If the UE 650 is already engaged in throughput intensive communication 610, the user not selecting the button 640 indicates to the device to continue to receive the throughput intensive communication.

If the user selects the button 640, the UE 650 can also create a timer and, after a predetermined passage of time such as 5 minutes, the UE can remove the notice 690 and can send the indication 620 again, requesting throughput intensive communication 610.

In addition, the base station 630 can determine whether the location of the UE has changed, such as the UE has gotten closer to the base station, and can determine whether, based on the new location, the base station can provide the desired uplink throughput and the desired downlink throughput needed for throughput intensive communication 610. If that is the case, the base station 630 can proactively notify the user that the throughput intensive communication 610 is available. Similarly, the base station 630 can monitor various indicators such as base station load, RF associated with the UE 650, the time of day, etc. If any of these indicators improve and enable the base station to provide throughput intensive communication 610, the base station can proactively send a notice indicating so to the UE.

The base station 630 can, based on the indication 620, communicate to other base stations that UE 650 is seeking throughput intensive communication 610. If the UE 650 changes location and is handed off to a different base station, the different base station can determine if it can offer throughput intensive communication 610 to the UE and, if so, can proactively send a notice to the UE indicating the XR communication availability.

By waiting for a notification from the network 100, or by waiting for the expiration of the predetermined passage of time before requesting throughput intensive communication 610, as opposed to continuously requesting throughput intensive communication 610, the UE reduces network 100 traffic. For example, the UE 650 can keep requesting the throughput intensive communication 610 every few seconds, e.g., three or four seconds, thus clogging the network 100. After receiving the indication from the user to cease requesting throughput intensive communication 610 or to cease engaging throughput rate intensive communication, the UE 650 can re-request the throughput intensive communication at a longer time interval, such as five minutes, 30 minutes, or an hour, thus reducing the network load over 100 times.

Figure 7:
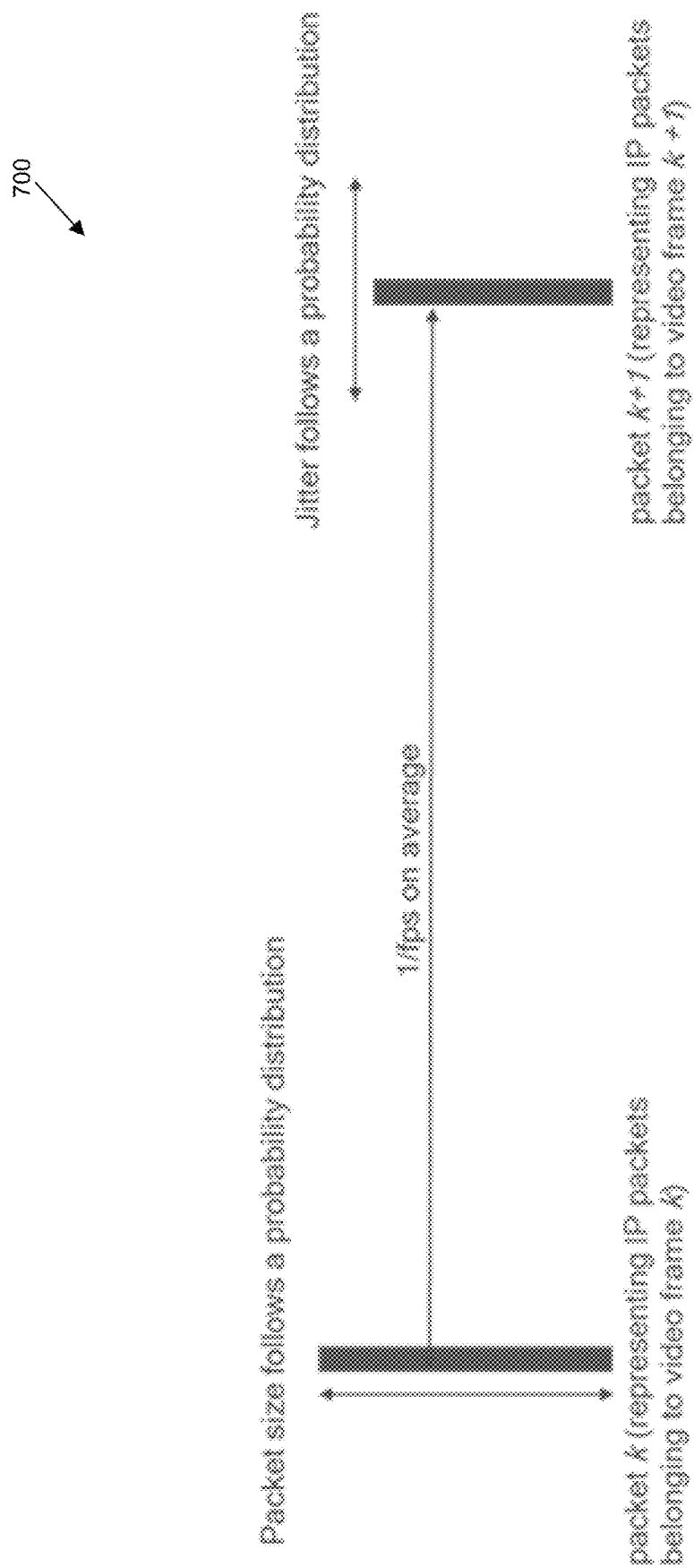
FIG. 7 shows a single stream download extended reality communication model.

FIG. 7 shows a single stream download extended reality communication model. Extended reality communication can be single stream or multi-stream. In the single stream extended reality communication 700, the extended reality DL traffic is modelled as a sequence of video frames arriving at the base station according to the predetermined video frame rates and random jitter. The size of each frame is also random according to a certain distribution.

In multi-streams extended reality communication model, the stream can consist of: option 1 including I-Frames and P-Frame, option 2 including audio and video data, or option 3 including field of view and omnidirectional stream.

In option 1, the extended reality communication can include a slice-based traffic model or a group of picture (GOP) base traffic model. In a slice-based traffic model, a single video frame is divided into N slices. Out of N, one slice is I slice and remaining N−1 slices are P slices. N packets (one I and N−1 P) packets correspond to one video frame arriving at the same time. In a GOP base traffic model, a single video frame is either I frame or P frame. I frame is transmitted every K frame, where K is the GOP size, i.e., every group of picture. One video frame arrives at a time as a packet.

In option 2, the extended reality communication can include video and audio data communicated via two streams. The first stream can carry video, while the second stream can carry audio. In option 3, the extended reality communication can include a first stream indicating a field of view, and a second stream including an omnidirectional view stream. The omnidirectional view stream enables the user to interactively explore the environment because the environment is omnidirectionally represented, i.e., from every viewpoint.

Figure 8:
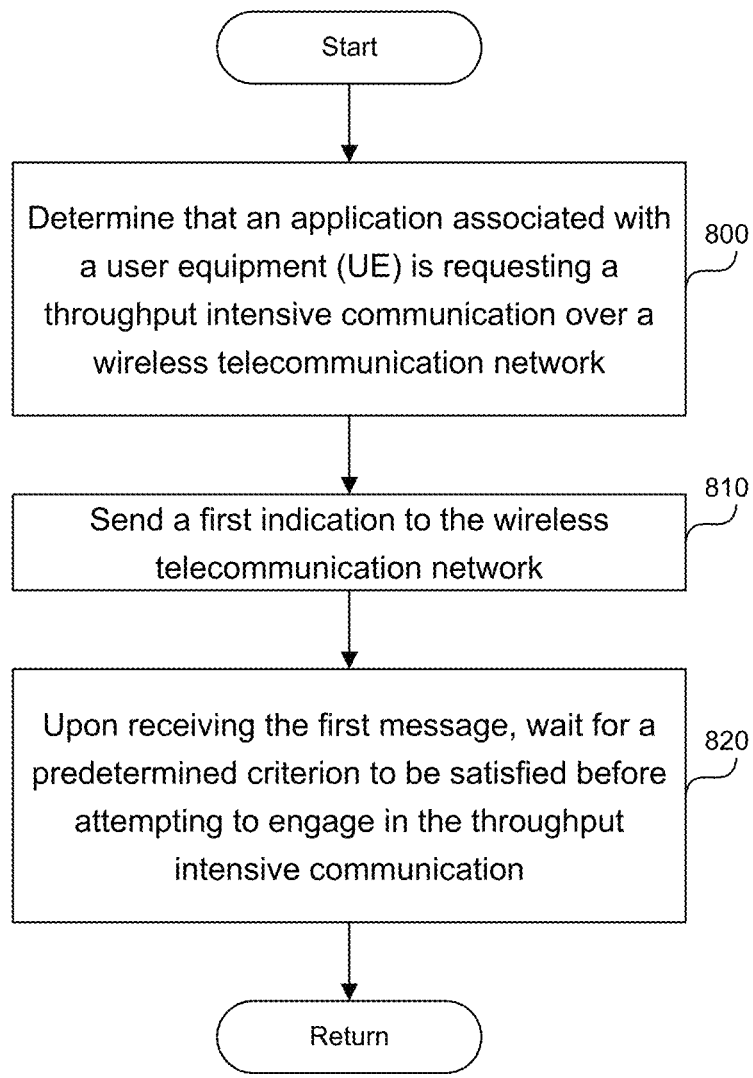
FIG. 8 is a flowchart of a method to reduce network traffic associated with throughput intensive communication over a 5G or higher generation wireless telecommunication network.

FIG. 8 is a flowchart of a method to reduce network traffic associated with throughput intensive communication over a 5G or higher generation wireless telecommunication network. In step 800, a hardware or software processor executing instructions described in this application can determine that an application associated with user equipment (UE) is requesting a throughput intensive communication over a wireless telecommunication network. The throughput intensive communication can be an extended reality communication, virtual reality communication, an augmented reality communication, etc. The throughput intensive communication is associated with a downlink throughput and an uplink throughput, where the downlink throughput is higher than the uplink throughput. The downlink throughput associated with the throughput intensive communication can be approximately above 20 Mbps, where an uplink throughput associated with throughput intensive communication can be approximately up to 10 Mbps.

In step 810, the processor can send a first indication to the wireless telecommunication network, where the first indication specifies to a base station associated with the wireless telecommunication network that the UE is requesting the throughput intensive communication. The base station can be configured to determine whether the base station can provide the downlink throughput and the uplink throughput to the UE. The base station can make the determination based on a location of the UE, RRC connected users, available base station resources, buffer estimation, HARQ feedback, etc. The base station can be configured to, upon determining that the base station cannot provide the downlink throughput and the uplink throughput to the UE, send a first message to the UE indicating that the throughput intensive communication is of low quality, e.g., not available.

In step 820, upon receiving the first message, the processor can wait for a predetermined criterion to be satisfied before attempting to engage in the throughput intensive communication, thereby reducing network traffic associated with the throughput intensive communication by eschewing sending repeated requests for the throughput intensive communication. The predetermined criterion can be receiving a second message from the wireless telecommunication network indicating that the throughput intensive communication is available. The predetermined criterion can be a predetermined passage of time at which point the UE can resend the request. The predetermined passage of time can be five minutes or longer. By contrast, by following the standard protocol, the UE can request to engage in the throughput intensive communication every few seconds. Consequently, by implementing the disclosed technology, the network traffic can reduce 5G RRC loads by over 50 times.

The processor can display a notification to a user indicating that the throughput intensive communication is unavailable, e.g., that the throughput intensive communication is of low quality. The notification can be an icon located in a corner of the display, e.g., the right top corner of the device screen, thus not significantly impacting visibility of content displayed underneath the notification. The user can remove the icon from the display so that the notification does not block the user from doing anything. The processor can create a timer configured to measure a passage of time since the display of the notification to the user. The processor can obtain an expiration time, such as five minutes, 30 minutes, or an hour. The expiration time can be user-adjusted. The processor can determine whether the passage of time since the display of the notification to the user is greater than equal to the expiration time. Upon determining that the passage of time since the display of the notification to the user is greater than or equal to the expiration time, the processor can cease displaying the notification to the user. Upon determining the passage of time since the display of the notification to the user is greater than or equal to the expiration time, the processor can send a second indication to the wireless telecommunication network requesting the throughput intensive communication with the UE. In another embodiment, the processor can wait for an input from the user indicating that the UE chooses to cease engaging with the extended reality communication. Only after receiving the input from the user does the processor cease requesting throughput intensive communication and wait for the timer to expire. If the user does not provide the input, the processor continues to request the extended reality communication.

The processor can determine whether the UE has changed location, where changing location includes the UE moving closer to the base station or connecting to a different base station. Upon determining that the UE has changed location, the processor can send a second indication to the wireless telecommunication network requesting the throughput intensive communication with the UE.

The processor can determine whether the UE is in connected mode or in the idle mode. In the connected mode the UE keeps its transmitter and receiver on, i.e., the UE's radio is in the on state. In the connected mode, the UE constantly communicates with the network so the UE knows its location at the cell level. While the UE is in connected mode, the processor can store the first indication at the base station. If the UE is in idle mode, the processor can delete the first indication. Upon determining that the UE is in idle mode, the processor can remove the first indication from the base station. The processor can determine whether the base station is capable of providing the throughput intensive communication based on the base station load, available base station resources, buffer estimation, HARQ feedback, etc. Upon determining that the base station is capable of providing the throughput intensive communication to the UE and that the UE is in connected mode, the processor can offer the throughput intensive communication to the UE.

The processor can, at a predetermined frequency, report a radiofrequency indicator associated with the UE to the base station. The predetermined frequency is determined by report periodicity setting which can be set at 120 ms or 480 ms, or other value. The radiofrequency indicator can be RSRP, Reference Signal Received Quality (RSRQ), or Signal to Interference Plus Noise Ratio (SINR). For example, when the UE is in connected mode, the UE keeps reporting RSRP and/or RSRQ to the base station. The base station can be configured to determine whether the reported radiofrequency indicator enables the throughput intensive communication, and upon determining that the reported radiofrequency enables the throughput intensive communication the base station can send a notification to the UE. Upon receiving the notification, the processor can engage in the throughput intensive communication.

The processor can cause the base station to send to a second base station a notification that the UE is requesting the throughput intensive communication. The processor can establish a connection between the UE and the second base station, after, for example, a handoff. The processor can cause the second base station to determine whether the second base station can provide the throughput intensive communication to the UE, without the UE requesting the throughput intensive communication. Upon causing the second base station to determine that the second base station can provide the throughput intensive communication to the UE, the processor can establish the throughput intensive communication between the UE and the second base station. In effect, when the UE connects to a different base station that can offer the throughput intensive communication, the UE is proactively notified.

The processor can send a second indication to the wireless telecommunication network, where the second indication specifies to the base station associated with the wireless telecommunication network that the UE is triggering an IP Multimedia Subsystem (IMS) voice call. Currently, the base station does not know when UE is triggering IMS voice call (either voice over LTE or voice over new radio), because the session initiation protocol (SIP) channel inside message is transparent to the base station. Only when the core network asks the base station to set up IMS voice channel does the base station know there is an IMS voice call ongoing.

The first indication and/or the second indication can include a user assistant information element new to 5G or higher generation communication protocol. Alternatively, the first and/or the second indication can use a spare bit associated with an existing user assistant information element. The processor can send the first indication to the base station along with a measurement associated with a radiofrequency of the UE, such as RSRP.

Figure 9:
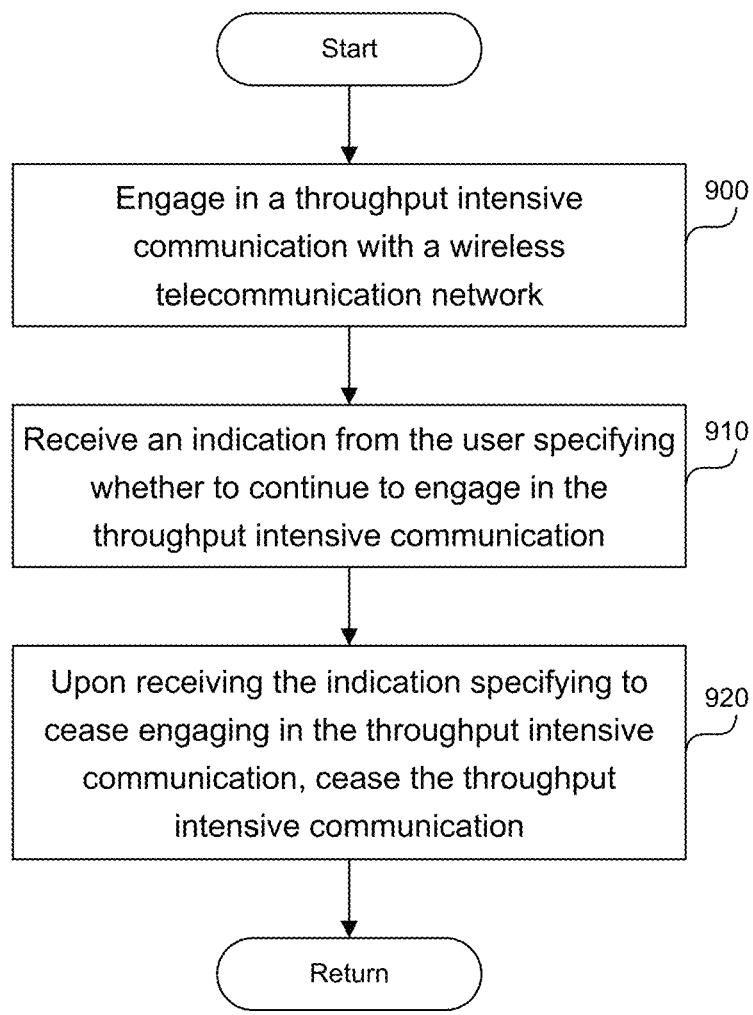
FIG. 9 is a flowchart of steps performed by a system to reduce network traffic associated with throughput intensive communication over a wireless telecommunication network.

FIG. 9 is a flowchart of steps performed by a system to reduce network traffic associated with throughput intensive communication over a wireless telecommunication network. In step 900, a throughput intensive application executing on a UE is configured to engage in a throughput intensive communication with a wireless telecommunication network. The throughput intensive communication can be associated with a desired downlink throughput and a desired uplink throughput, where the downlink throughput is higher than the uplink throughput. The throughput intensive application is configured to receive an indication from a base station of the wireless telecommunication network that the base station cannot provide the desired downlink throughput or the desired uplink throughput. The throughput intensive application can present the indication to a user associated with the UE.

In step 910, an input module can be configured to receive an indication from the user specifying whether the UE should continue to engage in the throughput intensive communication or the UE should cease engaging in the throughput intensive communication.

In step 920, upon receiving the indication specifying to cease engaging in the throughput intensive communication, the throughput intensive application can cease the throughput intensive communication. Otherwise, the throughput intensive application can continue with the throughput intensive communication even if the quality of service is low.

A connection module executing the network or the UE can be configured to determine whether the UE has changed location, where changing location includes the UE moving closer to the base station or connecting to a different base station. Upon determining that the UE has changed location, the connection module can send an indication to the wireless telecommunication network requesting the throughput intensive communication.

The base station can store the UE's first indication as long as the UE keeps in connected mode. If the UE is released to idle mode, the base station can remove the first indication. When the base station determines that the load in the base station is getting low and that the base station can support the desired uplink and downlink throughput, the base station can proactively notify the UE that the throughput intensive communication is available, and the base station can remove the icon indicating contrary.

A connection module running on the network can determine whether the UE is in connected mode. In the connected mode, the UE keeps its transmitter and receiver always "on," i.e., the UE's radio is in the "on" state. In the connected mode, the UE constantly communicates with the network so the network knows the UE's location at the cell level. While the UE is in connected mode, the network can store the first indication at the base station. Upon determining that the UE is in idle mode, the network can remove the first indication from the base station. The connection module can determine whether the base station is capable of providing the throughput intensive communication based on RRC, connected users available, base station resources, buffer estimation, HARQ feedback, etc. Upon determining that the base station is capable of providing the throughput intensive communication to the UE and that the UE is in connected mode, the connection module can offer the throughput intensive communication to the UE.

A connection module executing on the UE can, at a predetermined frequency, report a radiofrequency indicator associated with the UE to the base station. The base station can be configured to determine whether the reported radiofrequency indicator, such as RSRP or RSRQ, enables the throughput intensive communication. Upon determining that the reported radiofrequency indicator enables the throughput intensive communication, the base station can proactively send a notification to the UE indicating the availability of the throughput intensive communication. Upon receiving the notification, the connection module engages in the throughput intensive communication.

Computer System

Figure 10:
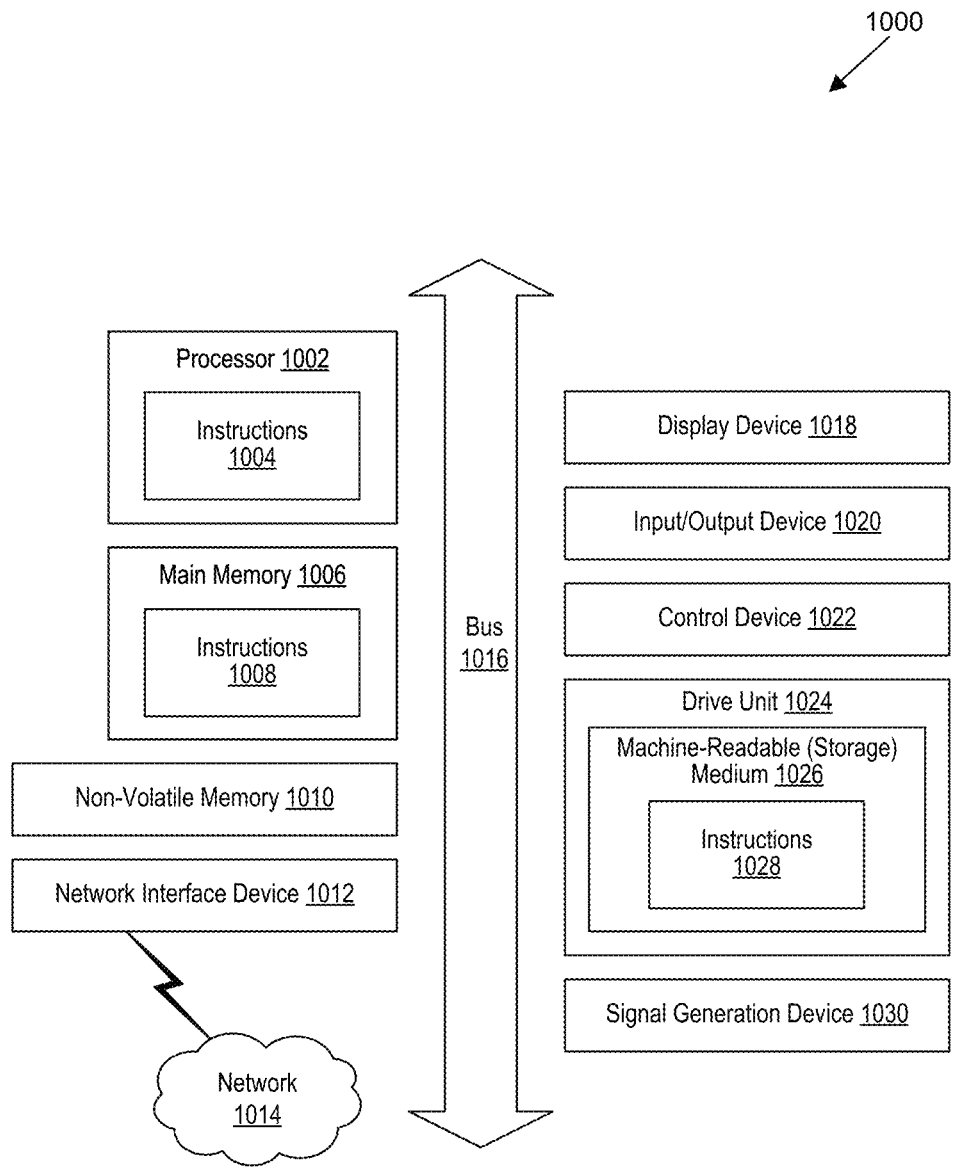
FIG. 10 is a block diagram that illustrates an example of a computer system 1000 in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, video display device 1018, an input/output device 1020, a control device 1022 (e.g., keyboard and pointing device), a drive unit 1024 that includes a storage medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the Figures and any other components described in this specification can be implemented.

The computer system 1000 can take any suitable physical form. For example, the computing system 1000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1000. In some implementations, the computer system 1000 can be an embedded computer system, a system-on-chip (SOC), a single-board computer system (SBC) or a distributed system such as a mesh of computer systems, or it can include one or more cloud components in one or more networks. Where appropriate, one or more computer systems 1000 can perform operations in real time, near real time, or in batch mode.

The network interface device 1012 enables the computing system 1000 to mediate data in a network 1014 with an entity that is external to the computing system 1000 through any communication protocol supported by the computing system 1000 and the external entity. Examples of the network interface device 1012 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable (storage) medium 1026 can include any medium that is capable of storing, encoding, or carrying a set of instructions for execution by the computing system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computing system 1000 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one non-transitory computer-readable storage medium storing instructions to reduce network traffic associated with an extended reality communication over a 5G or higher generation wireless telecommunication network which, when executed by at least one data processor of a system, causes the system to:
   determine that an application associated with a mobile device is requesting the extended reality communication over the 5G or higher generation wireless telecommunication network,
      wherein the extended reality communication includes real-and-virtual combined environments or human-machine interactions generated by computer technology and wearables, wherein a desired downlink throughput associated with the extended reality communication is approximately above 20 Mbps, and,
wherein a desired uplink throughput associated with the extended reality communication is approximately up to 10 Mbps;
send a first indication to the 5G or higher generation wireless telecommunication network,
wherein the first indication specifies to a base station associated with the 5G or higher generation wireless telecommunication network that the mobile device is requesting the extended reality communication,
wherein the base station is configured to determine whether the base station can provide the desired downlink throughput and the desired uplink throughput to the mobile device, and
wherein the base station is configured to, upon determining that the base station cannot provide the desired downlink throughput or the desired uplink throughput to the mobile device, send a first message to the mobile device indicating that the extended reality communication is of low-quality; and
upon receiving the first message, wait for a second message from the 5G or higher generation wireless telecommunication network indicating that the extended reality communication is available, thereby reducing network traffic associated with the extended reality communication by eschewing sending repeated requests for the extended reality communication.

2. The at least one non-transitory computer-readable storage medium of claim 1, comprising instructions to:
display a notification to a user indicating that the extended reality communication is of a low quality;
receive an input indicating that the mobile device chooses to cease engaging with the extended reality communication;
create a timer configured to measure a passage of time since the display of the notification to the user;
obtain an expiration time;
determine whether the passage of time since the display of the notification to the user is greater than or equal to the expiration time;
upon determining that the passage of time since the display of the notification to the user is greater than or equal to the expiration time, cease displaying the notification to the user; and
upon determining that the passage of time since the display of the notification to the user is greater than or equal to the expiration time, send a second indication to the 5G or higher generation wireless telecommunication network requesting the extended reality communication with the mobile device.

3. The at least one non-transitory computer-readable storage medium of claim 1, comprising instructions to:
determine whether the mobile device has changed location,
wherein changing location includes the mobile device moving closer to the base station or connecting to a different base station; and
upon determining that the mobile device has changed location, send a second indication to the 5G or higher generation wireless telecommunication network requesting the extended reality communication with the mobile device.

4. The at least one non-transitory computer-readable storage medium of claim 1, comprising instructions to:

determine whether the mobile device is in connected mode;
upon determining that the mobile device is in idle mode, remove the first indication from the base station;
determine whether the base station is capable of providing the extended reality communication; and
upon determining that the base station is capable of providing the extended reality communication to the mobile device and that the mobile device is in connected mode, offer the extended reality communication to the mobile device.

5. The at least one non-transitory computer-readable storage medium of claim 1, comprising instructions to:
at a predetermined frequency report a radio frequency indicator associated with the mobile device to the base station,
wherein the base station is configured to determine whether the reported radio frequency indicator enables the extended reality communication, and upon determining that the reported radio frequency indicator enables the extended reality communication, send a notification to the mobile device; and
upon receiving the notification, engage in the extended reality communication.

6. The at least one non-transitory computer-readable storage medium of claim 1, comprising instructions to:
cause the base station to send to a second base station a notification that the mobile device is requesting the extended reality communication;
establish a connection between the mobile device and the second base station;
cause the second base station to determine whether the second base station can provide the extended reality communication to the mobile device, without the mobile device requesting the extended reality communication; and
upon causing the second base station to determine that the second base station can provide the extended reality communication to the mobile device, establish the extended reality communication between the mobile device and the second base station.

7. The at least one non-transitory computer-readable storage medium of claim 1, comprising instructions to:
send a second indication to the 5G or higher generation wireless telecommunication network,
wherein the second indication specifies to the base station associated with the 5G or higher generation wireless telecommunication network that the mobile device is triggering an IP Multimedia Subsystem (IMS) voice call.

8. The at least one non-transitory computer-readable storage medium of claim 1, wherein the first indication includes a mobile device assistance information element new to 5G or higher generation communication protocol, or wherein the first indication uses a spare bit associated with an existing user assistant information element; and comprising instructions to:
send the first indication to the base station along with a measurement associated with a radio frequency of the mobile device.

9. A system comprising:
at least one hardware processor; and
at least one non-transitory memory storing instructions, which, when executed by the at least one hardware processor, cause the system to:

determine that an application associated with a user equipment (UE) is requesting a throughput intensive communication over a wireless telecommunication network,
   wherein the throughput intensive communication is associated with a downlink throughput and an uplink throughput,
   wherein the downlink throughput is higher than the uplink throughput;
send a first indication to the wireless telecommunication network,
   wherein the first indication specifies to a base station associated with the wireless telecommunication network that the UE is requesting the throughput intensive communication,
   wherein the base station is configured to determine whether the base station can provide the downlink throughput and the uplink throughput to the UE, and
   wherein the base station is configured to, upon determining that the base station cannot provide the downlink throughput or the uplink throughput to the UE, send a first message to the UE indicating that the throughput intensive communication is of low quality; and
upon receiving the first message, wait for a predetermined criterion to be satisfied before attempting to engage in the throughput intensive communication, thereby reducing network traffic associated with the throughput intensive communication by eschewing sending repeated requests for the throughput intensive communication.

10. The system of claim 9, comprising instructions to:
display a notification to a user indicating that the throughput intensive communication is unavailable;
create a timer configured to measure a passage of time since the display of the notification to the user;
obtain an expiration time;
determine whether the passage of time since the display of the notification to the user is greater than equal to the expiration time;
upon determining that the passage of time since the display of the notification to the user is greater than or equal to the expiration time, cease displaying the notification to the user; and
upon determining the passage of time since the display of the notification to the user is greater than or equal to the expiration time, send a second indication to the wireless telecommunication network requesting the throughput intensive communication with the UE.

11. The system of claim 9, comprising instructions to:
determine whether the UE has changed location,
   wherein changing location includes the UE moving closer to the base station or connecting to a different base station; and
upon determining that the UE has changed location, send a second indication to the wireless telecommunication network requesting the throughput intensive communication with the UE.

12. The system of claim 9, comprising instructions to:
determine whether the UE is in connected mode;
upon determining that the UE is in idle mode, remove the first indication from the base station;
determine whether the base station is capable of providing the throughput intensive communication; and
upon determining that the base station is capable of providing the throughput intensive communication to the UE and that the UE is in connected mode, offer the throughput intensive communication to the UE.

13. The system of claim 9, comprising instructions to:
at a predetermined frequency, report a radio frequency indicator associated with the UE to the base station,
   wherein the base station is configured to determine whether the reported radio frequency indicator enables the throughput intensive communication, and upon determining that the reported radio frequency indicator enables the throughput intensive communication, send a notification to the UE; and
upon receiving the notification, engage in the throughput intensive communication.

14. The system of claim 9, comprising instructions to:
cause the base station to send to a second base station a notification that the UE is requesting the throughput intensive communication;
establish a connection between the UE and the second base station;
cause the second base station to determine whether the second base station can provide the throughput intensive communication to the UE, without the UE requesting the throughput intensive communication; and
upon causing the second base station to determine that the second base station can provide the throughput intensive communication to the UE, establish the throughput intensive communication between the UE and the second base station.

15. The system of claim 9, comprising instructions to:
send a second indication to the wireless telecommunication network,
   wherein the second indication specifies to the base station associated with the wireless telecommunication network that the UE is triggering an IP Multimedia Subsystem (IMS) voice call.

16. The system of claim 9, wherein the first indication includes a user assistant information element new to 5G or higher generation communication protocol, or wherein the first indication uses a spare bit associated with an existing user assistant information element; and comprising instructions to:
send the first indication to the base station along with a measurement associated with a radio frequency of the UE.

17. A system comprising:
a throughput intensive application executing on a UE,
   wherein the throughput intensive application is configured to engage in a throughput intensive communication with a wireless telecommunication network,
   wherein the throughput intensive communication is associated with a desired downlink throughput and a desired uplink throughput,
   wherein the desired downlink throughput is higher than the desired uplink throughput,
   wherein the throughput intensive application is configured to receive a first indication from a base station of the wireless telecommunication network specifying that the base station cannot provide the desired downlink throughput or the desired uplink throughput, and
   wherein the throughput intensive application is configured to present the first indication to a user associated with the UE;
an input module configured to
   receive a second indication from the user specifying whether the UE should continue to engage in the throughput intensive communication or the UE should cease engaging in the throughput intensive communication; and upon receiving the second indication, specifying to cease engaging in the throughput intensive communication, wherein in response thereto, the throughput intensive application ceases the throughput intensive communication.

18. The system of claim 17, comprising a connection module configured to:

determine whether the UE has changed location,
wherein changing location includes the UE moving closer to the base station or connecting to a different base station; and upon determining that the UE has changed location, send a third indication to the wireless telecommunication network requesting the throughput intensive communication.

19. The system of claim 17, comprising a connection module configured to:

determine whether the UE is in connected mode;
upon determining that the UE is in idle mode, remove a third indication from the base station,
wherein the third indication requests the throughput intensive communication;

determine whether the base station is capable of providing the throughput intensive communication; and upon determining that the base station is capable of providing the throughput intensive communication to the UE and that the UE is in connected mode, offer the throughput intensive communication to the UE.

20. The system of claim 17, comprising a connection module configured to:

at a predetermined frequency, report a radio frequency indicator associated with the UE to the base station,
wherein the base station is configured to determine whether the reported radio frequency indicator enables the throughput intensive communication, and upon determining that the reported radio frequency indicator enables the throughput intensive communication, send a notification to the UE; and upon receiving the notification, engage in the throughput intensive communication.

\* \* \* \* \*